(12) United States Patent
Bassi et al.

(10) Patent No.: US 8,651,994 B2
(45) Date of Patent: Feb. 18, 2014

(54) DRIVE AXLE ASSEMBLY AND DISENGAGEMENT SYSTEM

(75) Inventors: Marco Bassi, Novate Milanese (IT); Arnaldo Freitas Camarão, São Paulo (BR); Egidio Miguel Gomes Correia, São Paulo (BR); Juscelino dos Reis, Osasco (BR); José Renan da Silva, Osasco (BR); Todd R. Ekonen, Howell, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 228 days.

(21) Appl. No.: 13/249,494

(22) Filed: Sep. 30, 2011

(65) Prior Publication Data

US 2013/0085031 A1    Apr. 4, 2013

(51) Int. Cl.
*F16H 48/06* (2006.01)

(52) U.S. Cl.
USPC ......... 475/221; 475/223; 475/230; 180/24.09

(58) Field of Classification Search
USPC ............. 475/221, 223, 230, 233, 248, 332; 180/24.1, 24.09, 24.11; 74/606 R
See application file for complete search history.

(56) References Cited

U.S. PATENT DOCUMENTS

| | | | |
|---|---|---|---|
| 1,243,720 A | 10/1917 | Eidson et al. | |
| 1,938,201 A * | 12/1933 | Wells | 475/198 |
| 4,046,210 A | 9/1977 | Nelson | |
| 4,754,847 A | 7/1988 | Glaze et al. | |
| 5,545,103 A * | 8/1996 | Gustin | 475/223 |
| 5,950,750 A * | 9/1999 | Dong et al. | 180/24.09 |
| 7,093,681 B2 * | 8/2006 | Strain | 180/14.2 |
| 7,553,250 B2 * | 6/2009 | Sachsenmaier | 475/199 |
| 2003/0019672 A1 | 1/2003 | Borgen et al. | |
| 2005/0026734 A1 * | 2/2005 | Ziech et al. | 475/246 |
| 2006/0089226 A1 | 4/2006 | Garcia et al. | |
| 2006/0272866 A1 | 12/2006 | Ziech | |
| 2006/0276297 A1 | 12/2006 | Ziech | |
| 2010/0248888 A1 | 9/2010 | Hamperl et al. | |
| 2011/0275470 A1 * | 11/2011 | Ekonen et al. | 475/198 |

FOREIGN PATENT DOCUMENTS

| | | |
|---|---|---|
| JP | 59053129 U | 4/1984 |
| JP | H0735156 U | 6/1995 |

OTHER PUBLICATIONS

Marco Bassi et al., "Drive Axle Assembly and Disengagement System" filed Sep. 30, 2011; 26 Pages; U.S. Appl. No. 13/249,630.
European Patent Office; Search report; Dec. 17, 2012; 5 pages.

* cited by examiner

*Primary Examiner* — Justin Holmes
(74) *Attorney, Agent, or Firm* — Brooks Kushman P.C.

(57) ABSTRACT

A drive axle assembly that may include an input shaft, an intermediate shaft, an output shaft, and an actuator unit. The actuator unit may move the intermediate shaft between a first position in which the intermediate shaft transmits torque to the output shaft and a second position in which the intermediate shaft does not transmit torque to the output shaft.

20 Claims, 4 Drawing Sheets

US 8,651,994 B2

DRIVE AXLE ASSEMBLY AND DISENGAGEMENT SYSTEM

TECHNICAL FIELD

The present application relates to a drive axle assembly for a vehicle.

BACKGROUND

A tandem axle assembly is disclosed in U.S. Patent Publication No. 2010/0248888.

SUMMARY

In at least one embodiment, a drive axle assembly is provided. The drive axle assembly may include an input shaft, an output shaft, an intermediate shaft, an interaxle differential unit, and an actuator unit. The interaxle differential unit may be disposed on the input shaft and may drive the intermediate shaft. The actuator unit may be configured to move the intermediate shaft between a first position in which the intermediate shaft transmits torque to the output shaft and a second position in which the intermediate shaft does not transmit torque to the output shaft.

In at least one embodiment, a drive axle assembly is provided. The drive axle assembly may include an input shaft, an output shaft, an intermediate shaft, and an interaxle differential unit. The intermediate shaft may move between a first position in which the intermediate shaft engages the output shaft and a second position in which the intermediate shaft is spaced apart from the output shaft. The interaxle differential unit may be disposed on the input shaft and may have an output gear that includes a center bore that may receive the input shaft and the intermediate shaft. The interaxle differential unit may transmit torque from the input shaft to the intermediate shaft via the output gear.

In at least one embodiment, a drive axle assembly is provided. The drive axle assembly may include an input shaft, an intermediate shaft, and an output shaft disposed along a first axis of rotation, a pinion disposed along a second axis of rotation, a drive gear, a driven gear and an interaxle differential unit. The pinion may provide torque to a wheel axle output shaft. The drive gear may be disposed on the input shaft. The driven gear may be disposed on the pinion and may engage the drive gear. The interaxle differential unit may be configured to rotate the drive gear and the intermediate shaft. Torque may be transmitted from the input shaft to the output shaft and the wheel axle output shaft when the intermediate gear engages the output shaft. Torque may be transmitted from the input shaft to the wheel axle output shaft but not to the output shaft when the intermediate gear does not engage the output shaft.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
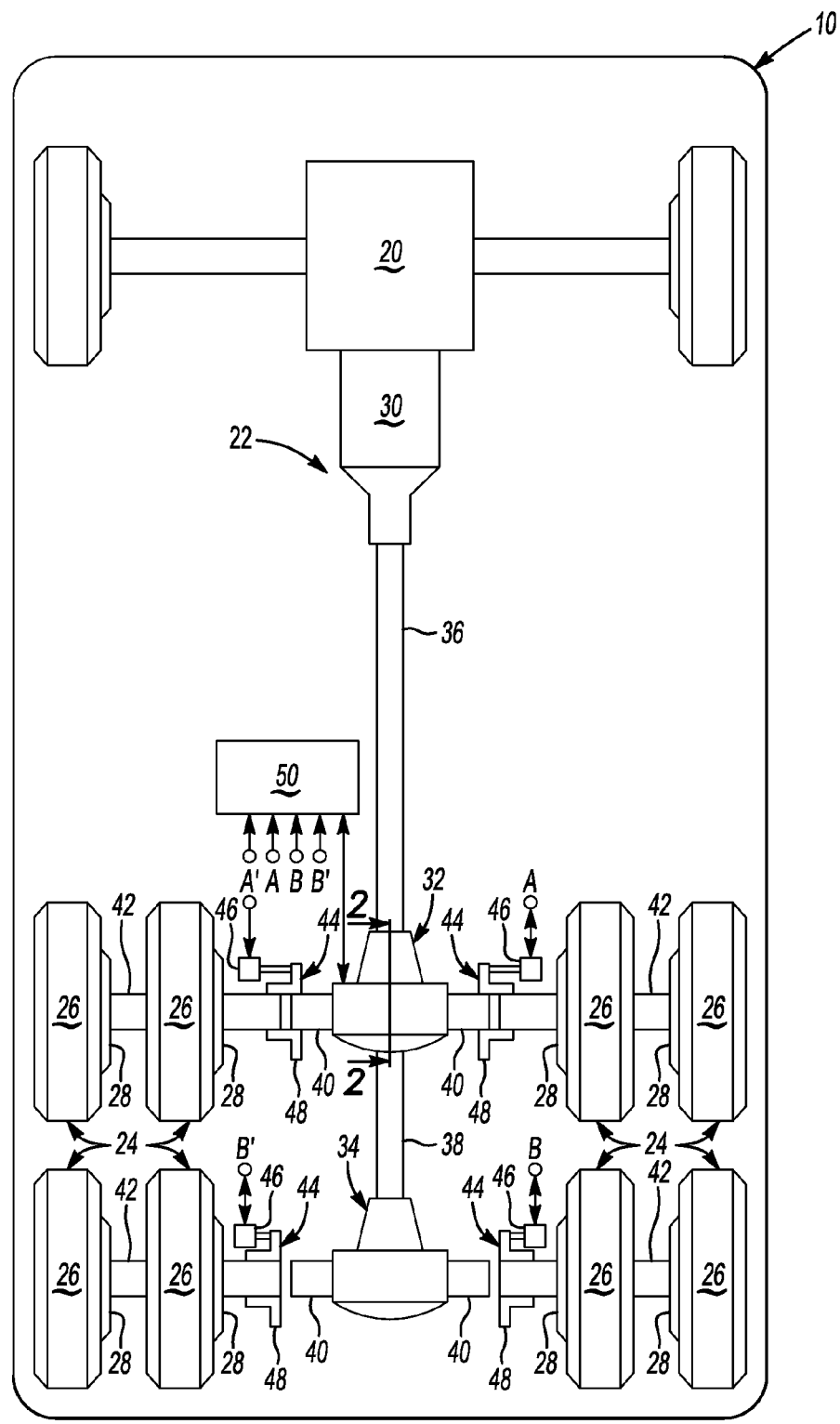
FIG. 1 is a schematic of an exemplary vehicle having an axle assembly.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels. The vehicle 10 may include one or more power sources 20 and a drivetrain 22.

The power source 20 may provide power that may be used to rotate one or more traction wheels. In FIG. 1, a single power source 20 is shown that may be configured as an internal combustion engine that may be adapted to combust any suitable type of fuel, such as gasoline, diesel fuel, or hydrogen. Alternatively, multiple or different power sources may be provided, such as may be employed with a hybrid vehicle or electric vehicle. In such embodiments, a power source could be an electric power source, such as a battery, capacitor, or fuel cell, or a non-electric power source, such as a hydraulic power source.

The drivetrain 22 may be driven or powered by one or more power sources 20 and may provide torque to one or more traction wheel assemblies 24 that may include a tire 26 mounted on a wheel 28. The drivetrain 22 may include a transmission 30 and one or more axle assemblies. In the embodiment shown, a tandem axle configuration is shown that includes a first axle assembly 32 and a second axle assembly 34. The first axle assembly 32 may be referred to as a forward-rear axle assembly. The second axle assembly 34 may be referred to as a rear-rear axle assembly. Optionally, additional axle assemblies may be provided that may be coupled together in series. The power source 20 may be coupled to the input of the transmission 30. An output of the transmission 30 may be coupled to an input of the first axle assembly 32, such as with a drive shaft 36. An output of the first axle assembly 32 may be selectively coupled to an input of the second axle assembly 34 via a prop shaft 38.

The first and second axle assemblies 32, 34 may each have a plurality of outputs that may be coupled to one or more wheel assemblies 24. In the embodiment shown, the first and second axle assemblies 32, 34 each have a pair of wheel axle output shafts 40. Each wheel axle output shaft 40 may be selectively or non-selectively coupled to a corresponding wheel axle 42 or half-shaft upon which one or more wheel assemblies 24 may be disposed.

A wheel axle disconnect unit 44 may be provided to couple or decouple a wheel axle output shaft 40 from a corresponding wheel axle 42. In at least one exemplary embodiment, the wheel axle disconnect unit 44 may include an actuator 46 that may be configured to actuate or move a coupling 48 between a first position and a second position. In the first position, the wheel axle output shaft 40 is coupled to the wheel axle 42 via the coupling 48 to permit torque to be transferred from an axle assembly 32, 34 to a wheel axle 42 and to its associated wheel assemblies 24. In the second position, the wheel axle output shaft 40 is disconnected or not coupled to the wheel axle 42 with the coupling 48. As such, torque is not transferred from the axle assembly 32, 34 to a wheel axle 42 or vice versa. For illustration purposes, the wheel axle disconnect units 44 associated with the first axle assembly 32 are shown in the first position while the wheel axle disconnect units 44 associated with the second axle assembly 34 are shown in the second position in FIG. 1. Although wheel axle disconnect units 44 are illustrated with both axle assemblies 32, 34, they may be deleted from either or both axle assemblies 32, 34 in one or more embodiments. For instance, wheel axle disconnect units 44 may not be provided with the first axle assembly 32 and/or the second axle assembly 34 in one or more embodiments. One or more synchronizers may also be provided to facilitate reconnection of the second axle assembly 34 to a wheel axle 42 or the first axle assembly 32 at vehicle speed.

The vehicle 10 may also include a control system 50 that may monitor and control operation of various vehicle systems and components, such as the first axle assembly 32 and the wheel axle disconnect units 44. For example, the control system 50 may communicate with and control the wheel axle disconnect units 44 associated with the first and second axle assemblies 32, 34 as represented by connection nodes A and A' and nodes B and B', respectively. If a wheel axle disconnect unit 44 is not provided with a particular axle assembly 32, 34, the corresponding connection nodes may be omitted.

Figure 2:
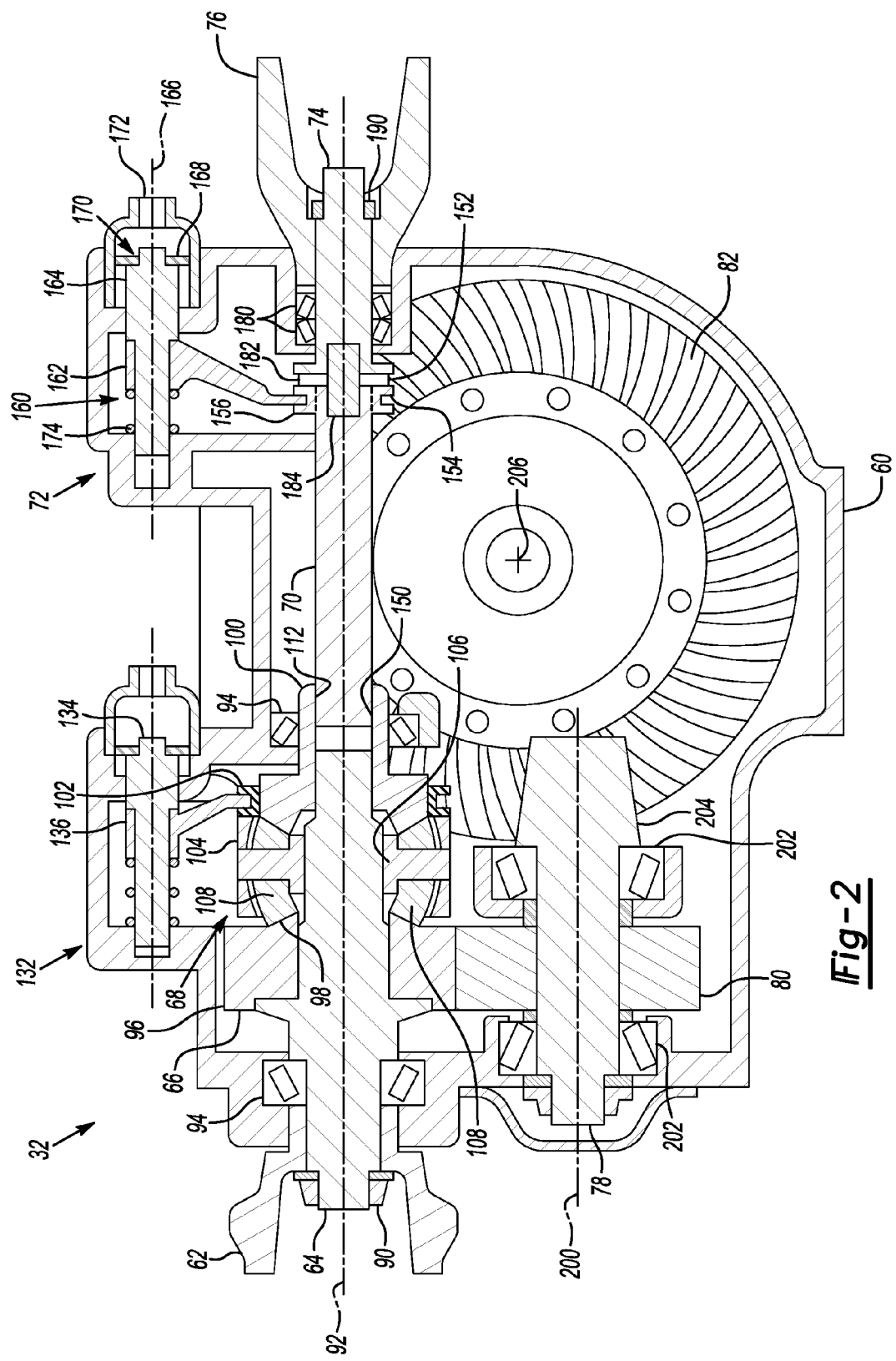
FIG. 2 is a cross section of an axle assembly along section line 2-2 showing the axle assembly in an engaged condition.

Referring to FIG. 2, the first axle assembly 32 is shown in more detail. The first axle assembly 32 may be configured to provide torque to its associated wheel assemblies 24 via its wheel axle output shafts 40 and to selectively provide torque to the second axle assembly 34. The first axle assembly 32 may include a housing 60, an input yoke 62, an input shaft 64, a drive gear 66, an interaxle differential unit 68, an intermediate shaft 70, an intermediate shaft actuator unit 72, an output shaft 74, an output yoke 76, a pinion 78, a driven gear 80, and a ring gear 82.

The housing 60 may receive various components of the first axle assembly 32. In addition, the housing 60 may facilitate mounting of the first axle assembly 32 to the vehicle 10.

The input yoke 62 may facilitate coupling of the first axle assembly 32 to the drive shaft 36. The input yoke 62 may be coupled to the drive shaft 36 in any suitable manner, such as with a universal joint. The input yoke 62 may also be fixedly coupled to the input shaft 64. For instance, the input yoke 62 may include a center bore that may receive an end of the input shaft 64. The center bore and the input shaft 64 may be provided with mating splines that may help align and secure the input yoke 62 to the input shaft 64. A fastener 90, such as a nut, may be threaded onto an end of the input shaft 64 to further secure and inhibit removal of the input yoke 62 from the input shaft 64.

The input shaft 64 may be configured to rotate about a first axis of rotation 92. For instance, the input shaft 64 may be supported by one or more bearings 94 that may be disposed on the housing 60. The bearings 94 may facilitate rotation of the input shaft 64 while inhibiting axial movement of the input shaft 64 along the first axis of rotation 92. The input shaft 64 may be located above the pinion 78 as will be described in more detail below.

Figure 4:
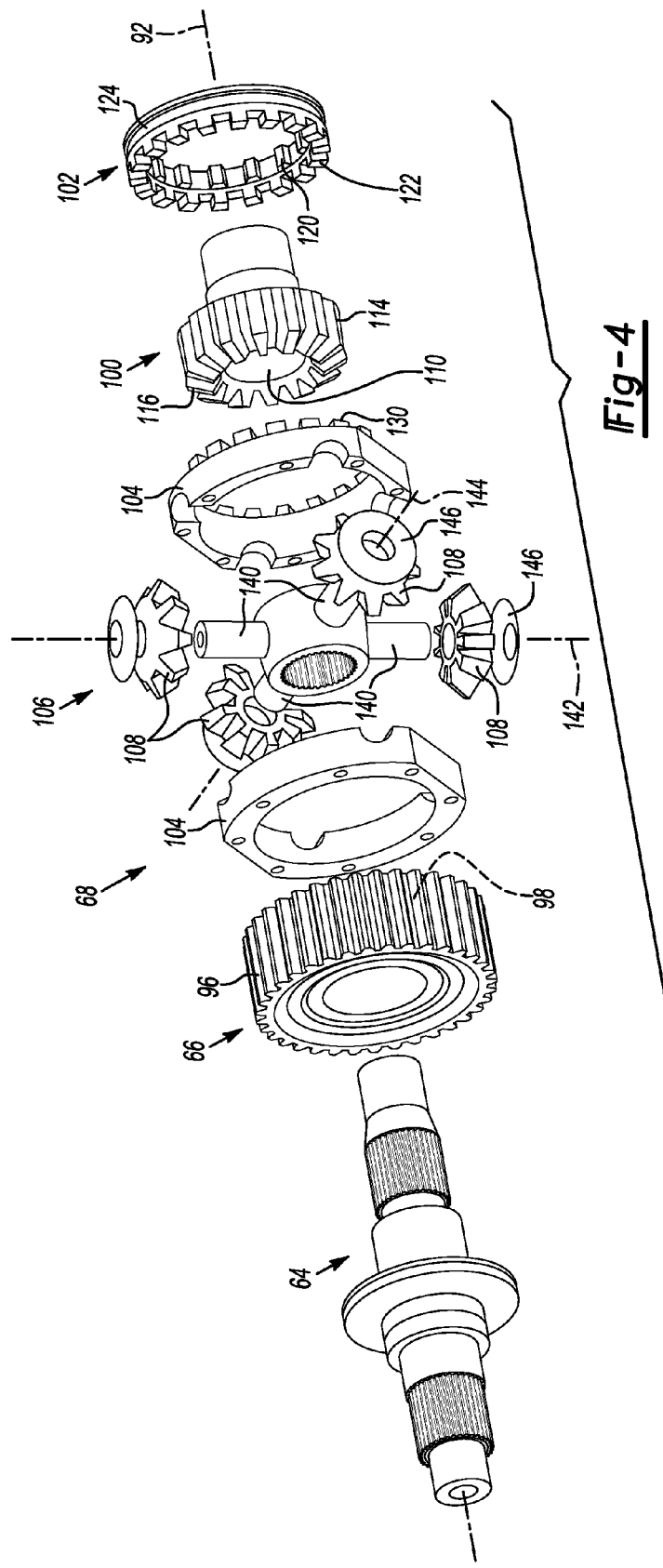
FIG. 4 is an exploded perspective view of an interaxle differential unit of the axle assembly.

Referring to FIGS. 2 and 4, the drive gear 66 may be disposed on an exterior surface of the input shaft 64. In at least one embodiment, the drive gear 66 may have a substantially smooth center bore that may receive the input shaft 64 and may allow the drive gear 66 to rotate about or with respect to the input shaft 64 under certain operating conditions. The drive gear 66 may include a first gear portion 96 and a second gear portion 98. The first gear portion 96 may include a plurality of teeth that may be arranged around an outside diameter of the drive gear 66. The second gear portion 98 may include a set of teeth that may be arranged on a side or face of the drive gear 66 that faces toward the interaxle differential unit 68. In at least one embodiment, the second gear portion 98 may also have a radial tooth configuration in which the teeth of the second gear portion 98 are disposed opposite the teeth of the first gear portion 96 such that the ends of the teeth face toward the interaxle differential unit 68. The second gear portion 98 may also be referred to as a face gear portion of the drive gear 66.

The interaxle differential unit 68 may be disposed in the housing 60 on the input shaft 64. The interaxle differential unit 68 may be configured to compensate for speed differences between the first axle assembly 32 and the second axle assembly 34. The interaxle differential unit 68 may include an output gear 100, a lock collar 102, a case 104, a spider 106, and a plurality of pinion gears 108.

The output gear 100 may be disposed proximate an exterior surface of the input shaft 64. For example, the output gear 100 may extend along the first axis of rotation 92 and may have a center bore 110. A portion of the center bore 110 may receive and/or support an end of the input shaft 64. In various embodiments, an end of the input shaft 64 may be disposed in the center bore 110 and optionally a bearing may be provided between the input shaft 64 and center bore 110 to facilitate alignment and rotation. The center bore 110 may also include a spline or splined portion 112 that may be spaced apart from the input shaft 64 and that may receive and engage a corresponding spline on the intermediate shaft 70. The output gear 100 may also include a first output gear portion 114 and a second output gear portion 116. The first output gear portion 114 may include a plurality of teeth that may be arranged around an outside diameter of the output gear 100 for mating with the lock collar 102. The second output gear portion 116 may include a set of teeth that may be arranged on a side or face of the output gear 100 that faces toward the spider 106 and pinion gears 108. The second output gear portion 116 may also be referred to as a face gear portion of the output gear 100.

The lock collar 102 may be moveably disposed on the output gear 100. The lock collar 102 may be generally ring-shaped and may include a first gear portion 120, a second gear portion 122, and an annular groove 124. The first gear portion 120 may include a plurality of teeth that may be arranged on an inside diameter of the lock collar 102 for mating with the first output gear portion 114. The second gear portion 122 may include a set of teeth that are arranged on a side or face of the lock collar 102 that faces toward the case 104. The annular groove 124 may be spaced apart from the first and second gear portions 120, 122. The annular groove 124 may extend continuously around the lock collar 102 and may receive a linkage as will be described in more detail below.

The case 104 may receive various components of the interaxle differential unit 68. In the embodiment shown, the case 104 has a two piece construction. The case 104 may be spaced apart from the housing 60, drive gear 66, and the output gear 100 to facilitate rotation with respect to these components. The case 104 may include a case gear portion 130 that may include a set of teeth that may be arranged on a side or face of the case 104 that faces toward the lock collar 102. The case gear portion 130 may selectively engage the second gear portion 122 of the lock collar 102. More specifically, the case gear portion 130 may engage the second gear portion 122 when the lock collar 102 is in a locked position and may be spaced apart from the second gear portion 122 when the lock collar 102 is in an unlocked position. In the locked position, the output gear 100 and input shaft 64 rotate together about the first axis of rotation 92. More specifically, the input shaft 64 rotates the spider 106 which rotates the case 104 which rotates the lock collar 102 which rotates the output gear 100. In the unlocked position, the output gear 100 and input shaft 64 may not rotate together about the first axis of rotation 92. More specifically, the disconnection between the lock collar 102 and the case 104 may allow the output gear 100 to rotate at a different rotational velocity than the input gear 64.

Positioning of the lock collar 102 may be facilitated by a lock collar actuator unit 132. The lock collar actuator unit 132 may include an actuator 134. The actuator 134 may be of any suitable type, such as a pneumatic, hydraulic, vacuum, mechanical, electrical, or electromechanical actuator. The actuator 134 may be coupled to lock collar 102 via a linkage 136, such as a fork, that may have a first end that may be received in the annular groove 124 of the lock collar 102 and a second end that may engage the actuator 134.

The spider 106 may be generally disposed in the case 104 and may be fixedly disposed on the input shaft 64. For instance, the spider 106 may include a center bore that may include splines that mate with corresponding splines on the input shaft 64 to help align and secure the spider 106 to the input shaft 64. As such, the spider 106 may rotate about the first axis of rotation 92 with the input shaft 64. The spider 106 may also include a set of pins 140. The pins 140 may extend away from the center bore and may be arranged along a first axis 142 and a second axis 144. The first axis 142 and the second axis 144 may intersect and may be disposed substantially perpendicular to each other and substantially perpendicular to the axis of rotation 92. Ends of the pins 140 may be received by the case 104 and may be spaced apart from the housing 60 so as not to interfere with rotation of the interaxle differential unit 68.

A pinion gear 108 may be rotatably disposed on each pin 140. Each pinion gear 108 may be generally disposed in the case 104 and may be retained on a corresponding pin 140 with a fastener 146, such as a thrust washer that may engage the case 104. In the embodiment shown, two pinion gears 108 may rotate about pins 140 that extend along the first axis 142 and two pinion gears 108 may rotate about pins 140 that extend along the second axis 144. Each pinion gear 108 may include a set of teeth that mate with the second gear portion 98 of the drive gear 66 and mate with the second output gear portion 116 of the output gear 100.

Referring again to FIG. 2, the intermediate shaft 70 may be rotatably disposed in the housing 60. For example, the intermediate shaft 70 may extend along and may be configured to rotate about the first axis of rotation 92. A first end of the intermediate shaft 70 may be spaced apart from the input shaft 64 by a gap. In addition, the first end of the intermediate shaft 70 may have a spline 150 disposed along an exterior surface. The teeth of the spline 150 may extend substantially parallel to the first axis of rotation 92 and may be configured to engage and mate with the teeth of the spline 112 in the center bore 110 of the output gear 100. As such, these mating splines may permit the intermediate shaft 70 to slide or move along the first axis of rotation 92 while maintaining engagement between the intermediate shaft 70 and the output gear 100. A second end of the intermediate shaft 70 that is disposed opposite the first end may have a larger diameter than the first end and may include a gear portion 152 and an annular groove 154. The gear portion 152 may include a set of teeth that may be arranged on a side or face of the intermediate shaft 70 that faces toward the output shaft 74. In at least one embodiment, the gear portion 152 may also have a radial tooth configuration in which the teeth of the gear portion 152 are disposed radially about the first axis of rotation 92 along a diameter such that ends of the teeth may face toward the output shaft 74. The annular groove 154 may be spaced apart from the gear portion 152 and may be disposed at predetermined radial distance from the first axis of rotation 92. The annular groove 154 may extend continuously around the second end and may receive a linkage as will be described in more detail below. In at least one embodiment, the intermediate shaft 70 may be assembled from multiple components. For instance, the second end of the intermediate shaft 70 may be configured as a collar that may be disposed around the outside diameter of a generally cylindrical body of the intermediate shaft 70. In at least one embodiment, the collar 156 may be fixedly disposed on the body of the intermediate shaft 70. An example of a location of such a collar 156 with respect to the body of the intermediate shaft 70 is shown in dotted lines in FIG. 2. As another option, the collar 156 may be moveably disposed on the body of the intermediate shaft 70. For instance, the second end may be configured as a collar 156 that has a center bore that may have splines that mate with corresponding splines on the exterior of the body of the intermediate shaft 70. The collar may include the gear portion 152 and annular groove 154 as previously described and may move along the body of the intermediate shaft 70 to selectively engage the output shaft 74. As referred to herein, movement or actuation of the intermediate shaft 70 is intended to include movement of the entire intermediate shaft 70 or a portion of the intermediate shaft 70, such as movement of a collar 156 with respect to the body or another portion of the intermediate shaft 70.

The intermediate shaft actuator unit 72 may be provided for actuating the intermediate shaft 70. The intermediate shaft actuator unit 72 may include an actuator 160 and a linkage 162, such as a fork. The actuator 160 may be of any suitable type, such as a pneumatic, hydraulic, vacuum, mechanical, electrical, or electromechanical actuator. In FIG. 2, a pneumatic actuator is shown. The actuator 160 may be coupled to the intermediate shaft 70 via the linkage 162. For example, the linkage 162 may have a first end that may be received in and engage the annular groove 154 of the intermediate shaft 70 and a second end that may engage the actuator 160. The intermediate shaft actuator unit 72 may move between a first position and a second position as will be described in more detail below.

In the exemplary embodiment shown, the actuator 160 may include an actuator shaft 164 that may be configured move along an axis 166. A piston or diaphragm 168 may be fixedly disposed near a first end of the actuator shaft 164 and disposed in a chamber 170. The chamber 170 may have a port 172 that may be configured to provide or vent a pressurized fluid, such as air, that may be provided by a pressurized fluid source (not shown). The flow and venting of the pressurized fluid may be controlled with valves, such as an electrically controlled solenoid valve, in a manner known to those skilled in the art. Such control may be facilitated by the control module 50. A spring 174 may also be provided to facilitate positioning the actuator shaft 164 and linkage 162. The spring 174 may bias the actuator shaft 164 toward a first position or to the right from the perspective show when pressurized fluid is vented from the chamber 170. Similarly, pressurized fluid provided to the chamber 170 may exert force upon the piston or diaphragm 168 and overcome the biasing force of the spring 174 to move the actuator shaft 164 to the second position or to the left from the perspective shown.

The output shaft 74 may extend along and may be configured to rotate about the first axis of rotation 92. For instance, the output shaft 74 may be supported by one or more bearings 180 that may be disposed on the housing 60. The bearings 180 may facilitate rotation of the output shaft 74 while inhibiting axial movement along the first axis of rotation 92. The output shaft 74 may include a gear portion 182 that may include a set of teeth that are arranged on a side or face of the output shaft 74 that faces toward the intermediate shaft 70. In at least one embodiment, the set of teeth may have a radial tooth configuration in which the teeth of the gear portion 182 are disposed radially about the first axis of rotation 92 along a diameter such that ends of the teeth may face toward the intermediate shaft 70.

An alignment pin 184 may be provided to help align the intermediate shaft 70 with the output shaft 74. The alignment pin 184 may extend along the first axis of rotation 92 and may extend between ends of the intermediate shaft 70 and the output shaft 74. The alignment pin 184 may not be fixedly coupled to at least one of the intermediate shaft 70 or the output shaft 74 to permit axial movement of the intermediate shaft 70.

The output yoke 76 may facilitate coupling of the first axle assembly 32 to the prop shaft 38. The output yoke 76 may be coupled to the prop shaft 38 in any suitable manner, such as with a universal joint. The output yoke 76 may be fixedly coupled to the output shaft 74. For instance, the output yoke 76 may include a center bore that may receive an end of the output shaft 74. The center bore and the output shaft 74 may be provided with mating splines that may help align and secure the output yoke 76 to the output shaft 74. A fastener 190, such as a nut, may be threaded onto an end of the output shaft 74 to further secure and inhibit removal of the output yoke 76 from the output shaft 74.

The pinion 78 may be spaced apart from the input shaft 64 and may be configured to rotate about a second axis of rotation 200. For instance, the pinion 78 may be supported by one or more bearings 202 that may be disposed on the housing 60. The bearings 202 may facilitate rotation of the pinion 78 while inhibiting axial movement of the pinion 78 along the second axis of rotation 200. In at least one embodiment, the first and second axes of rotation 92, 200 may be spaced apart and extend substantially parallel to each other. A pinion gear 204 may be disposed at an end of the pinion 78. The pinion gear 204 may be integrally formed with the pinion 78 and may include a set of teeth that mate with corresponding teeth on one or more ring gears 82. The ring gear 82 may be configured to rotate about a third axis of rotation 206 and may be coupled to a wheel axle output shaft 40 of the first axle assembly 32. The pinion 78 and/or second axis of rotation 200 may be positioned below the third axis of rotation 206. Moreover, the input shaft 64, interaxle differential unit 68, intermediate shaft 70, output shaft 74 and other components disposed along the first axis of rotation 92 may be positioned above the pinion 78 and the second and third axes of rotation 200, 206 in one or more embodiments. This "high entry" configuration may position these components above lubricant that may accumulate in the bottom of the housing 60, thereby reducing or avoiding frictional drag with the lubricant that may otherwise reduce operational efficiency of the first axle assembly 32.

The driven gear 80 may be fixedly disposed on an exterior surface of the pinion 78. The driven gear 80 may include a plurality of teeth that may be generally arranged about an outside diameter of the driven gear 80 for mating with the drive gear 66.

Figure 3:
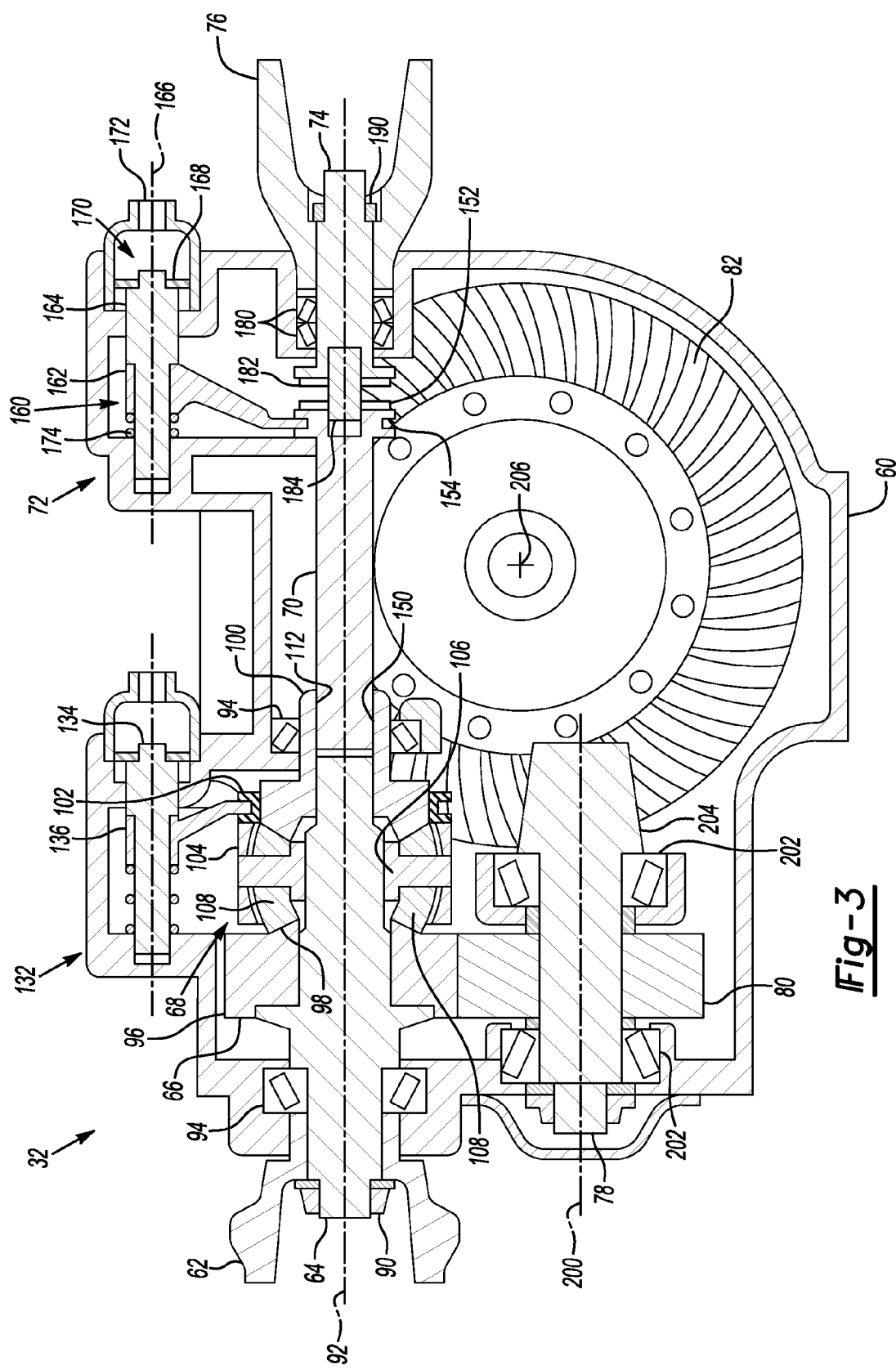
FIG. 3 is a cross section of the axle assembly along section line 2-2 showing the axle assembly in a disengaged condition.

Operation of the first and second axle assemblies 32, 34 may best be understood by comparing FIGS. 2 and 3.

In FIG. 2, the first axle assembly 32 is shown in an engaged condition in which torque is transmitted from the first axle assembly 32 to the second axle assembly 34. In the engaged condition, the gear portion 152 of the intermediate shaft 70 engages the gear portion 182 of the output shaft 74. Positioning of the intermediate shaft 70 may be accomplished utilizing the intermediate shaft actuator unit 72. In the engaged condition, torque that is provided to the input shaft 64 may be transmitted to the intermediate shaft 70 via the interaxle differential unit 68 and its output gear 100 and from the intermediate shaft 70 to the output shaft 74. Torque may be transmitted from the output shaft 74 to the second axle assembly 34 via the prop shaft 38. Torque transmission from the first axle assembly 32 to the second axle assembly 34 may occur irrespective of whether the interaxle differential unit 68 is locked or unlocked.

In FIG. 3, the first axle assembly 32 is shown in a disengaged condition in which torque is not transmitted from the first axle assembly 32 to the second axle assembly 34. In the disengaged condition, the gear portion 152 of the intermediate shaft 70 is spaced apart from the gear portion 182 of the output shaft 74. Positioning of the intermediate shaft 70 may be accomplished by utilizing the intermediate shaft actuator unit 72. In the disengaged condition, torque that is provided to the input shaft 64 is transmitted to the intermediate shaft 70 as previously described, but torque is not transferred from the intermediate shaft 70 to the output shaft 74. In addition, the interaxle differential unit 68 may be positioned in the locked position since torque is not transmitted to the output shaft 74. Movement to the locked position may occur after the intermediate shaft 70 disengages the output shaft 74 and may be controlled by the control system 50.

Disengagement of the second axle assembly 34 may also provide an opportunity for reducing energy consumption and improving vehicle fuel economy. For instance, the drivetrain or components of the second axle assembly 34, such as gears and bearings, may cause frictional drag or parasitic energy losses that may inhibit rotation of its associated wheel assemblies 24. This frictional drag may be inhibited or reduced by disconnecting or decoupling the wheel axle output shafts 40 of the second axle assembly 34 from its corresponding wheel axles 42 using the wheel axle disconnect units 44 as previously discussed and/or by lifting the second axle assembly 34 so that its wheel assemblies 24 do not engage the road, which may reduce vehicle energy consumption and reduce tire wear. In addition, disengagement of an axle assembly may improve durability and life of the axle assembly and its components due to decreased operation and wear.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle assembly comprising:
    an input shaft configured to receive a torque;
    an output shaft that is spaced apart from the input shaft;
    an interaxle differential unit disposed on the input shaft;
    an intermediate shaft that is disposed between the input and output shafts and configured to be driven by the interaxle differential unit; and
    an actuator unit configured to move the intermediate shaft between a first position in which the intermediate shaft engages and transmits torque to the output shaft and a second position in which the intermediate shaft does not engage or transmit torque to the output shaft.

2. The drive axle assembly of claim 1 wherein the input shaft, intermediate shaft, and output shaft extend along and are configured to rotate about a first axis of rotation.

3. The drive axle assembly of claim 2 wherein the intermediate shaft moves along the first axis of rotation when the intermediate shaft moves between the first position and the second position.

4. The drive axle assembly of claim 1 wherein the intermediate shaft is spaced apart from the input shaft.

5. The drive axle assembly of claim 1 wherein the output shaft is configured to be coupled to a second drive axle assembly, wherein the output shaft drives the second drive axle assembly when the intermediate shaft is in the first position.

6. The drive axle assembly of claim 1 wherein the interaxle differential unit is disposed in a locked position when the intermediate shaft is moved to the second position.

7. The drive axle assembly of claim 1 wherein the intermediate shaft includes an annular groove disposed on an end that is disposed near the output shaft, wherein the actuator unit includes an actuator and a linkage that has a first end that is disposed on the actuator and a second end that is disposed in the annular groove.

8. A drive axle assembly comprising:
an input shaft;
an output shaft spaced apart from the input shaft;
an intermediate shaft disposed between the input and output shafts, wherein the intermediate shaft is positionable in a first position in which the intermediate shaft engages the output shaft and a second position in which the intermediate shaft is spaced apart from the output shaft; and
an interaxle differential unit disposed on the input shaft, wherein the interaxle differential unit includes an output gear that includes a center bore that receives the input shaft and the intermediate shaft;
wherein the interaxle differential unit transmits torque from the input shaft to the intermediate shaft via the output gear.

9. The drive axle assembly of claim 8 wherein the output gear and intermediate shaft include mating splines that allow the intermediate shaft to move axially along a first axis of rotation between the first and second positions.

10. The drive axle assembly of claim 8 wherein the output gear and input shaft are disposed along a first axis of rotation and wherein the interaxle differential unit is configured to allow the input shaft and output gear to rotate at different speeds.

11. The drive axle assembly of claim 8 wherein the interaxle differential unit includes a spider fixedly disposed on the input shaft and a set of pinion gears that are rotatably disposed on the spider, wherein the members of the set of pinion gears each engage the output gear and a drive gear that is rotatably disposed on the input shaft.

12. The drive axle assembly of claim 11 wherein the drive gear includes a first gear portion and a second gear portion, wherein the first gear portion engages a driven gear to provide torque to a pinion that is coupled to a wheel axle output shaft and the second gear portion engages the set of pinion gears to receive torque from the interaxle differential unit.

13. The drive axle assembly of claim 12 wherein the interaxle differential unit further comprises a case and a lock collar, wherein the case receives the spider and the set of pinion gears, wherein the lock collar moves between a locked position in which the lock collar engages the case and an unlocked position in which the lock collar is spaced apart from the case.

14. The drive axle assembly of claim 13 wherein the lock collar is moved to the locked position when the intermediate shaft is spaced apart from the output shaft.

15. A drive axle assembly comprising:
an input shaft, an intermediate shaft, and an output shaft disposed along a first axis of rotation;
a pinion disposed along a second axis of rotation, the pinion being configured to provide torque to a wheel axle output shaft;
a drive gear disposed on the input shaft;
a driven gear that is disposed on the pinion and that engages the drive gear; and
an interaxle differential unit disposed on and configured to be driven by the input shaft, wherein the interaxle differential unit is configured to rotate the drive gear and the intermediate shaft;
wherein torque is transmitted from the input shaft to the output shaft and the wheel axle output shaft when the intermediate shaft engages the output shaft, and wherein torque is transmitted from the input shaft to the wheel axle output shaft but not to the output shaft when the intermediate shaft does not engage the output shaft.

16. The drive axle assembly of claim 15 wherein the drive gear is configured to rotate about the input shaft.

17. The drive axle assembly of claim 15 wherein the driven gear is fixedly disposed on the pinion.

18. The drive axle assembly of claim 15 further comprising an alignment pin disposed along the first axis of rotation that engages the intermediate shaft and the output shaft and allows the intermediate shaft to move with respect to the output shaft.

19. The drive axle assembly of claim 15 wherein the intermediate shaft is spaced apart from the input shaft and fixedly coupled to the interaxle differential unit.

20. The drive axle assembly of claim 15 wherein the first axis of rotation is disposed above the second axis of rotation.

* * * * *